US012682392B2

(12) United States Patent
Zou et al.

(10) Patent No.: US 12,682,392 B2
(45) Date of Patent: Jul. 14, 2026

(54) COMPUTING RESOURCE CONFIGURATION METHOD AND DEVICE FOR ENTERPRISE CLOUDIFICATION

(71) Applicant: Kuyun (Shanghai) Information Technology Co., Ltd., Shanghai (CN)

(72) Inventors: Binbin Zou, Shanghai (CN); Yang Li, Shanghai (CN); Qing Han, Shanghai (CN)

(73) Assignee: Kuyun (Shanghai) Information Technology Co., Ltd., Shanghai (CN)

( * ) Notice: Subject to any disclaimer, the term of this patent is extended or adjusted under 35 U.S.C. 154(b) by 470 days.

(21) Appl. No.: 18/092,328

(22) Filed: Jan. 1, 2023

(65) Prior Publication Data

US 2023/0342841 A1     Oct. 26, 2023

Related U.S. Application Data

(63) Continuation of application No. PCT/CN2022/095466, filed on May 27, 2022.

(30) Foreign Application Priority Data

Apr. 21, 2022   (CN) .......................... 202210423881.2

(51) Int. Cl.
| | |
|---|---|
| *G06Q 10/0631* | (2023.01) |
| *G06F 9/50* | (2006.01) |
| *G06Q 30/08* | (2012.01) |

(52) U.S. Cl.
CPC ........... *G06Q 30/08* (2013.01); *G06F 9/5027* (2013.01)

(58) Field of Classification Search
CPC .............................. G06Q 30/08; G06F 9/5027
See application file for complete search history.

(56) References Cited

U.S. PATENT DOCUMENTS

| | | | |
|---|---|---|---|
| 10,069,693 B1 * | 9/2018 | Daptardar | ........... H04L 41/5054 |
| 10,452,441 B1 * | 10/2019 | Subramanian | ......... G06N 20/20 |

(Continued)

*Primary Examiner* — Hadi S Armouche
(74) *Attorney, Agent, or Firm* — Rondaus PLLC; George Liu

(57)         ABSTRACT

An embodiment of the present invention discloses a computing resource configuration method and device for enterprise cloudification. The method comprises the following steps: obtaining parameters configured by a user through a configuration page, wherein the parameters include a proportion of a bidding instance to an on-demand instance; determining a total amount of computing resources required by a computing task after the computing task is obtained; determining the computing resources corresponding to the bidding instance and the computing resources corresponding to the on-demand instance based on existing computing resources, the total amount of the computing resources and the proportion; and applying for the computing resources from a cloud provider based on the computing resources corresponding to the bidding instance and the computing resources corresponding to the on-demand instance. Big data is computed in a bidding instance mode so that the total cost of the computing resources is greatly reduced. Moreover, the technical problem of high total cost of the computing resources caused by performing data computing in a mode of depending on a reserved instance and/or the on-demand instance is solved.

17 Claims, 3 Drawing Sheets

(56)                    References Cited

U.S. PATENT DOCUMENTS

| 11,886,932 | B1 * | 1/2024 | Dasgupta | G06F 9/4881 |
|---|---|---|---|---|
| 2014/0047119 | A1 * | 2/2014 | Wong | G06F 9/5072 |
| | | | | 709/226 |
| 2016/0164797 | A1 * | 6/2016 | Reque | G06F 9/5077 |
| | | | | 718/1 |
| 2016/0358249 | A1 * | 12/2016 | Iyer | H04L 67/10 |
| 2020/0310852 | A1 * | 10/2020 | Featonby | G06F 9/5077 |
| 2020/0310853 | A1 * | 10/2020 | Featonby | G06F 9/45558 |
| 2021/0322872 | A1 * | 10/2021 | Byskal | G06F 9/50 |
| 2021/0390481 | A1 * | 12/2021 | Wertheimer | H04L 47/762 |

* cited by examiner

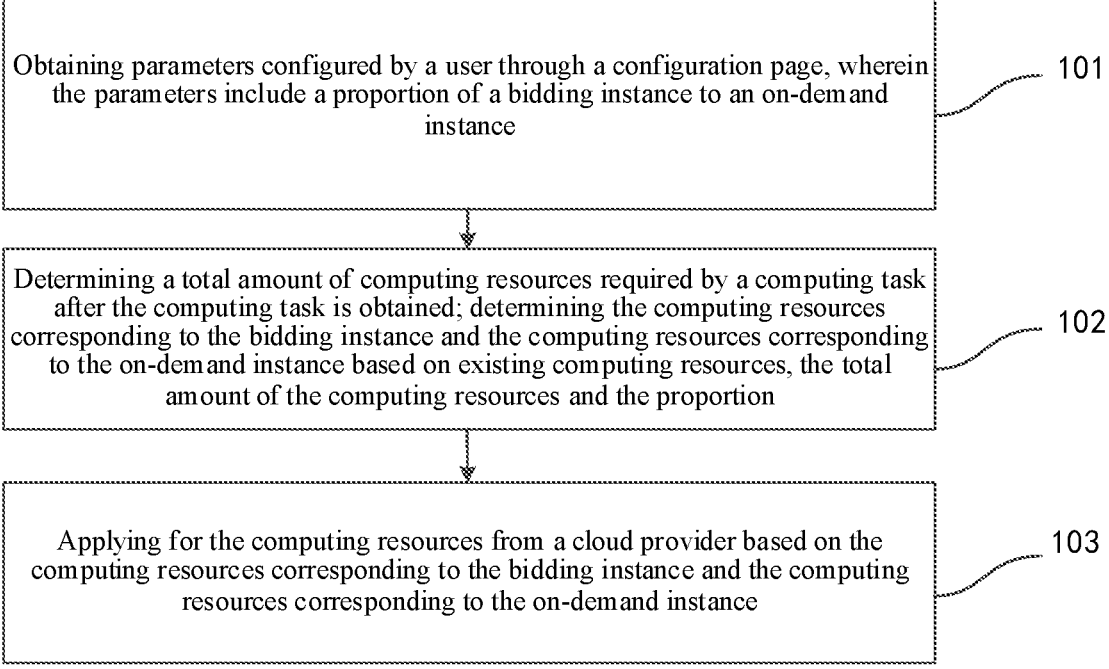

Obtaining parameters configured by a user through a configuration page, wherein the parameters include a proportion of a bidding instance to an on-demand instance — 101

Determining a total amount of computing resources required by a computing task after the computing task is obtained; determining the computing resources corresponding to the bidding instance and the computing resources corresponding to the on-demand instance based on existing computing resources, the total amount of the computing resources and the proportion — 102

Applying for the computing resources from a cloud provider based on the computing resources corresponding to the bidding instance and the computing resources corresponding to the on-demand instance — 103

FIG. 1

COMPUTING RESOURCE CONFIGURATION METHOD AND DEVICE FOR ENTERPRISE CLOUDIFICATION

The present application is a continuation of International Application No. PCT/CN2022/095466, filed May 27, 2022, which claims the priority of Chinese Patent Application No. 202210423881.2, field on Apr. 21, 2022. The contents of International Application No. PCT/CN2022/095466 and Chinese Patent Application No. 202210423881.2 are hereby incorporated by reference.

TECHNICAL FIELD

The present invention relates to the technical field of enterprise cloudification, and particularly relates a computing resource configuration method and device for enterprise cloudification.

BACKGROUND ART

The enterprise cloudification refers to a process that an enterprise carries out application in the aspects of informatization infrastructure, management, business and the like on the basis of the Internet and connects social resources, shared services and capabilities through the Internet and cloud computing means.

A bidding instance refers to an idle computing capability in the cloud, which is one of modes for a cloud supplier to sell its computing capability, and the other two modes are an on-demand instance and a reserved instance, wherein the on-demand instance is an instance of paying according to the use time; and the reserved instance is an instance of paying according to fixed time such as one year, two years and three years.

With cloud computing, a user can meet the rapid development of enterprise or personal business and respond to market requirements like using water and electricity to meet life requirements. At present, more and more enterprises with a large amount of business data select cloudification, and utilize the cloud computing capacity to accelerate the processes of data acquisition, data cleaning, data processing, model establishment and data output so as to meet rapid development and trial and error of businesses and generate data value. TCO (Total Cost of Ownership) exists objectively in the process, and due to the fact that the process is frequently carried out, the process needs to be repeatedly operated as long as new data exist.

In the related techniques, the enterprise achieves above computing process in a mode of purchasing on-demand instances and/or reserving instances, and there is always a problem of the TCO.

SUMMARY OF THE PRESENT INVENTION

A main objective of the present invention is to provide a computing resource configuration method and device for enterprise cloudification.

In order to achieve above objective, in a first aspect, the present invention provides a computing resource configuration method for enterprise cloudification. The method comprises the following steps: obtaining parameters configured by a user through a configuration page, wherein the parameters include a proportion of a bidding instance to an on-demand instance; determining a total amount of computing resources required by a computing task after the computing task is obtained; determining the computing resources corresponding to the bidding instance and the computing resources corresponding to the on-demand instance based on existing computing resources, the total amount of the computing resources and the proportion; and applying for the computing resources from a cloud provider based on the computing resources corresponding to the bidding instance and the computing resources corresponding to the on-demand instance.

Optionally, before applying for the computing resources from the cloud provider, the method further comprises the following steps: computing a difference value between the current remaining computing resources and the total amount of the computing resources when a computing resource recovering event of the cloud provider or a downtime event is monitored; and applying for computing resources from the cloud provider based on the difference value, the configured parameters, the computing resources corresponding to the bidding instance, and the computing resources corresponding to the on-demand instance Optionally, the step of obtaining the parameters configured by the user through the configuration page further includes: obtaining a bidding mode of the bidding instance, wherein the bidding mode includes a floating bidding mode and a fixed price mode; in the floating bidding mode, the computing resources corresponding to the bidding instance and the computing resources corresponding to the on-demand instance are directly determined based on the configured parameters; and in the fixed bidding mode, if the set bidding price is lower than the market price, the computing resources corresponding to the bidding instance and the computing resources corresponding to the on-demand instance are determined again based on the configured parameters after the cloud provider recovers the computing resources.

Optionally, the step of obtaining the parameters configured by the user through the configuration page further includes: obtaining types of instances configured by the user through the configuration page; and determining the number of the required different instance types based on the types of the instances and the total amount of computing resources required by the computing task in a computing resource creation process.

Optionally, the step of obtaining the parameters configured by the user through the configuration page includes: obtaining the percentage of time delay errors of the tasks configured by the user through the configuration page.

Optionally, the step of obtaining the parameters configured by the user through the configuration page further includes: obtaining the maximum value of the computing resources configured by the user through the configuration page; and obtaining the minimum value of the computing resources configured by the user through the configuration page.

Optionally, the method further comprises the following steps: monitoring existing computing resources; and releasing idle computing resources if the idle computing resources exist in the existing computing resources.

In a second aspect, the present invention provides a computing resource configuration device for enterprise cloudification. The device comprises a parameter configuration unit which is configured to be used for obtaining parameters configured by the user through the configuration page, wherein the parameters include the proportion of the bidding instance to the on-demand instance; a computing resource scheduling module which is configured to be used for determining the total amount of computing resources required by the computing task after the computing task is obtained; and determining the computing resources corresponding to the bidding instance and the computing resources corresponding to the on-demand instance based on existing computing resources, the total amount of the computing resources and the proportion; an automatic orchestrating module which is configured to be used for applying for the computing resources from a cloud provider based on the computing resources corresponding to the bidding instance and the computing resources corresponding to the on-demand instance; and/or a computing resource rebalancing module which is configured to be used for computing a difference value between the current remaining computing resources and the total amount of the computing resources when the computing resource recovering event of the cloud provider or the downtime event is monitored; and enabling the automatic orchestrating module to apply for computing resources from the cloud provider based on the difference value, the configured parameters, the computing resources corresponding to the bidding instance, and the computing resources corresponding to the on-demand instance.

In a third aspect, the present invention provides a computer readable storage medium, being used for storing computer instructions, wherein the computer instructions are used for enabling a computer to execute any one of the computing resource configuration method for enterprise cloudification in the first aspect.

In a fourth aspect, the present invention provides a kind of electronic equipment. The electronic equipment comprises:

The computing resource configuration method for enterprise cloudification in an embodiment of the present invention comprises the following steps: obtaining the parameters configured by the user through the configuration page, wherein the parameters include the proportion of the bidding instance to the on-demand instance; determining the total amount of computing resources required by the computing task after the computing task is obtained; determining the computing resources corresponding to the bidding instance and the computing resources corresponding to the on-demand instance based on existing computing resources, the total amount of the computing resources and the proportion; and applying for the computing resources from the cloud provider based on the computing resources corresponding to the bidding instance and the computing resources corresponding to the on-demand instance. Big data is computed in a bidding instance mode so that the total cost of the computing resources is greatly reduced. Moreover, the technical problem of high total cost of the computing resources caused by performing data computing in a mode of depending on a reserved instance and/or the on-demand instance is solved.

BRIEF DESCRIPTION OF THE DRAWINGS

In order to more clearly illustrate the specific embodiments of the present invention or the technical solutions in the prior art, the following will briefly introduce the accompanying drawings used in the description of the specific embodiments or the prior art. Obviously, the drawings in the following description are some embodiments of the present invention, and for those of ordinary skill in the art, other drawings can also be obtained from these drawings without creative efforts.

FIG. 1 is a flowchart of a computing resource configuration method for enterprise cloudification in an embodiment of the present invention;

DETAILED DESCRIPTION OF THE PRESENT INVENTION

Figure 2:
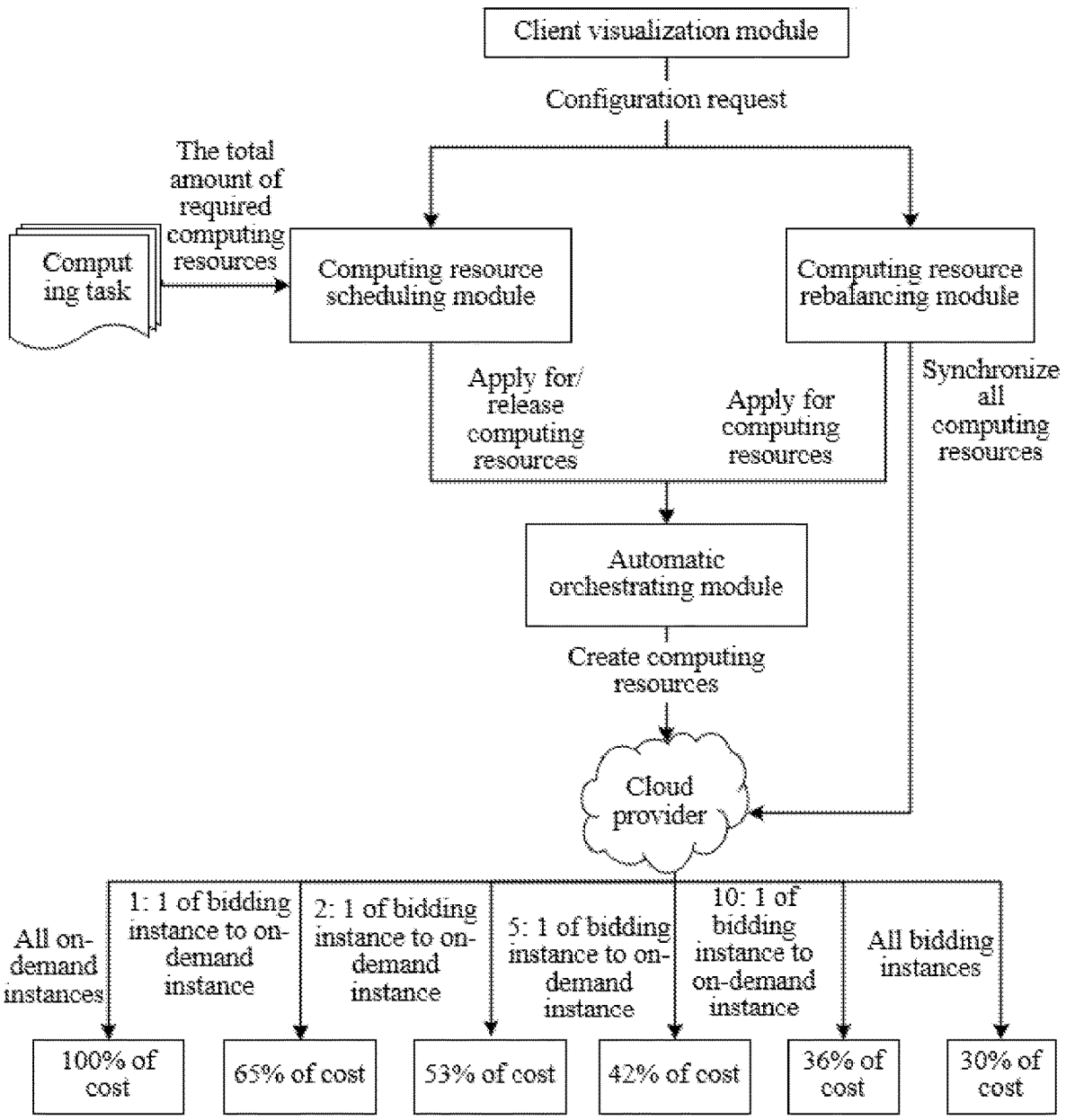
FIG. 2 is an application scenario diagram of a computing resource configuration device for enterprise cloudification in an embodiment of the present invention.

In order to make those skilled in the art better understand the solutions of the present invention, the technical solutions in the embodiments of the present disclosure will be clearly and completely described below with reference to the accompanying drawings in the embodiments of the present invention. Obviously, the described embodiments are only some of the embodiments of the present invention, but not all of the embodiments. Based on the embodiments in the present invention, all other embodiments obtained by persons of ordinary skill in the art without creative efforts shall fall within the protection scope of the present invention.

It should be noted that the terms "first", "second" and the like in the specification and claims of the present invention and the above accompanying drawings are used to distinguish similar objects, but are not necessarily used to describe a specific sequence or sequence. It is to be understood that the data so used are interchangeable under appropriate circumstances for the embodiments of the present invention described herein. In addition, the terms "comprising" and "having", and any variations thereof, are intended to cover non-exclusive inclusion, for example, a process, method, system, product or device comprising a series of steps or units is not necessarily limited to those steps or units expressly listed, but may include other steps or units not expressly listed or inherent to the process, method, product or device.

It should be noted that the embodiments of the present invention and the features of the embodiments may be combined with each other under the condition of no conflict. The present invention will be described in detail below with reference to the accompanying drawings and in conjunction with embodiments.

In order to reduce the TCO, some cloud service orchestration tools are mainly used in related techniques to provide computing resources for the above processes (using cloud computing capabilities to accelerate big data computing processes of data acquisition, data cleaning, data processing, model establishment, data output, etc.) in an automatic manner, and these computing resources are released in the automatic manner after the whole data processing process is finished. Due to the particularity of the computing resources, the computing resources do not need to run all the time like business applications, and the computing resources are needed only when new data exists. Therefore, these computing resources often do not need purchasing of reserved instances (purchasing instances based on the costs of use for one year, two years, or three years, and there will be a certain discount compared to on-demand instances under the same use time) through cloud providers (such as Alibaba Cloud, Huawei Cloud, Amazon Cloud, and Google Cloud) like business applications, these computing resources will be often provided by purchasing of on-demand instances (paying based on the use time).

Although a part of TCO is really reduced to a certain extent in the mode of purchasing the on-demand instance compared with the mode of purchasing the reserved instance, once the data types increase, the processing time prolongs, and the generation of new data is accelerated, the TCO of the on-demand instance can be increased rapidly and even exceeds that of the reserved instance.

In the embodiment, the bidding instance is an instance of which the market price continuously floats along with the change of supply and demand. The reserved instance is an instance for paying according to fixed time such as one year, two years and three years. The on-demand instance is an instance for paying according to the use time. TCO is the total cost of ownership. Terraform is an orchestration tool for infrastructure automation.

Both of the above instances are not friendly to TCO. It is difficult to have a good way to meet different levels of optimization of TCO. Therefore, the embodiment discloses a computing cost optimization solution based on the bidding instance (the cloud provider generally provides part of idle resources in an auction-like mode, a high bidder obtains the use right of the instance, and the discount proportion is very high, the lowest discount proportion can be 90% off, and generally, the average discount proportion is 70% off), and remarkable TCO optimization can be achieved regardless of the increases of the data types and the data processing time, and the acceleration of the generation of new data.

According to the embodiment, the present invention provides a computing resource configuration method for enterprise cloudification. As shown in FIG. 1, the method comprises the following steps 101 to 104:

Step 101: obtaining the parameters configured by the user through the configuration page, wherein the parameters include the proportion of the bidding instance to the on-demand instance.

In the embodiment, the user can enter a page set by a computing cluster through a browser access link, and the parameters can be configured on the page, wherein the parameters can include but are not limited to the proportion configuration of the bidding instance to the on-demand instance; and moreover, the parameters can also include the configuration of the parameters such as instance type configuration, priority configuration, bidding mode, task time delay error and maximum and minimum values of the computing resources.

As an optional implementation mode of the embodiment, the step of obtaining the parameters configured by the user through the configuration page includes: obtaining the types of instances configured by the user through the configuration page; and determining the number of the required different instance types based on the types of the instances and the total amount of computing resources required by the computing task in the computing resource creation process.

In the optional implementation mode of the embodiment, the instance type may be a machine type, and different machine types may include different numbers of cores. Different instance types are set, and then the required quantity of instances of different types can be computed based on the total amount of the computing resources required.

As an optional implementation mode of this embodiment, the step of obtaining the parameters configured by the user through the configuration page further includes: obtaining the percentage of the time delay errors of the tasks configured by the user through the configuration page.

In the optional implementation mode of the embodiment, the execution time of the computing resources can be determined based on the total amount of the computing resources required by the computing task; and then a time delay difference value is determined based on the percentage of the time delay error and the execution time.

In the mode that the bidding price floats along with the market price, the time delay error is completely taken as a compensation time for the computing resource rebalancing module to reapply for the resources after the computing resources are recovered by the cloud provider in the whole computing process. In the fixed price mode, one part of the time delay error can be used as the time of the pricing process, and the other part of the time delay error can be used as the compensation time for the computing resource rebalancing module to reapply for the resources.

As an optional implementation mode of the embodiment, the step of obtaining the parameters configured by the user through the configuration page further includes: obtaining the maximum value of the computing resources configured by the user through the configuration page; and taking the maximum value as the total amount of computing task resources when the total amount of computing resources required exceeds the maximum value.

In the optional implementation mode of the embodiment, the maximum value and the minimum value of the computing resources can be computed through the configuration page. By configuring the minimum value, the resources computed according to the minimum value can be provided by default in advance, the computing resources are kept resident and can be directly operated in case of computing tasks existing without the resource computing and applying process of the computing resources, and the resource use amount of the computing tasks can be limited by the maximum value. If the total amount of the required computing resources exceeds the configured maximum value in the data processing process, the total amount of default resources is treated as the computing resources configured according to the maximum value in the data processing process, and the applied resources cannot exceed the computing resources corresponding to the maximum value.

Further, priority configuration is the priority configuration of the instance types, and through priority configuration, which kinds of instance type or which instance types (with high priority) can be preferentially used for resource application during resource application. Therefore, the probability that the instances of certain types are preferentially created in the resource creation process is improved.

It can be understood that all the parameters are configurable, and option is provided through a unified configuration library.

Step 102: determining the total amount of computing resources required by a computing task after the computing task is obtained; and determining the computing resources corresponding to the bidding instance and the computing resources corresponding to the on-demand instance based on existing computing resources, the total amount of the computing resources and the proportion.

In the embodiment, the step can be completed by the computing resource scheduling module, and the computing resource scheduling module can be used for computing the number of the required bidding instances and the on-demand instances according to the total amount of resources required by a current task and above set content. The required computing resources are created from the cloud provider by the automatic orchestrating module. Specifically, the total amount of the required computing resources is computed according to the current computing task (the computing resources can be computed by the number of cores), then the missing computing resource capacity can be determined according to the existing idle computing resources in the current computing cluster, and the missing computing resource amount of the bidding instances and the computing resource amount of the on-demand instances are determined based on the missing computing resource capacity and the proportion of the configured bidding instances to the on-demand instances. The computing resource amount and other configured parameters can be sent to the automatic orchestrating module together to realize the application of the computing resource amount.

As an optional implementation mode of the embodiment, the method further comprises the steps of monitoring existing computing resources; and releasing the idle computing resources if the idle computing resources exist in the existing computing resources.

In the optional implementation mode of the embodiment, when the missing computing resource capacity is determined, whether computing resources in a computing cluster are idle at present or not can be monitored (for example, no task runs on the computing cluster); if the idle time exceeds a certain time threshold value, the recovery process of the computing resources can be carried out; and a computing resource recovery request can be sent to the automatic orchestrating module in the recovery process, and then the automatic orchestrating module responds to the request to release the computing resources.

Step 103: applying for the computing resources from the cloud provider based on the computing resources corresponding to the bidding instance and the computing resources corresponding to the on-demand instance.

In the embodiment, this step can be completed by the automatic orchestrating module, and the computing resources are dynamically created or released from the cloud provider by receiving the resource application request and/or the resource recovery request sent by the computing resource scheduling module. The cloud resources can be created and released through a declarative language by using the capability of the automatic orchestrating framework, such as a Terraform framework.

As an optional implementation mode of the embodiment, before applying for the computing resources from the cloud provider, the method further comprises the following steps: computing the difference value between the current remaining computing resources and the total amount of the computing resources when the computing resource recovering event of the cloud provider or the downtime event is monitored; and applying for the computing resources from the cloud provider based on the difference value, the configured parameters, the computing resources corresponding to the bidding instance and the computing resources corresponding to the on-demand instance.

In the optional implementation mode of the embodiment, the method in this step can be implemented by establishing the computing resource rebalancing module, and the total amount of computing resources required by the computing task is rebalanced. When a rebalancing mechanism is triggered, firstly, the difference value between the number of current remaining computing resources and the total amount of the required computing resources is computed to obtain the total amount of missing computing resources, and the total amount of missing computing resources and the configured parameters are sent to an automatic module to reapply for the computing resources.

Further, the mode of triggering the rebalancing mechanism includes: as the bidding instance is carried out in an auction mode, when the price is lower than the market price, the instance will be recovered by the cloud provider, and the recovered instance may cause insufficient computing resources; or some computing resources are subjected to downtime due to certain accidental reasons to cause insufficient computing resources, once it is monitored that the resources are recovered by the cloud provider or accidentally subjected to downtime, the rebalancing mechanism will be started, and all computing resource information applied from the cloud provider can be synchronized after the computing resources are applied each time in this embodiment.

As an optional implementation mode of the embodiment, the step of obtaining the parameters configured by the user through the configuration page further includes: obtaining the bidding mode of the bidding instance, wherein the bidding mode includes the floating bidding mode and the fixed price mode; in the floating bidding mode, the computing resources corresponding to the bidding instance and the computing resources corresponding to the on-demand instance can be directly determined based on the configured parameters; and in the fixed bidding mode, if the set bidding price is lower than the market price, the computing resources corresponding to the bidding instance and the computing resources corresponding to the on-demand instance are determined again based on the configured parameters after the cloud provider recovers the computing resources.

In the optional implementation mode of the embodiment, the bidding mode include a mode that bidding prices float along with market prices, and a second mode that fixed bidding prices are used.

If floating bidding is used, the bidding prices and the total resource amount of on-demand instances are computed and issued to the automatic orchestrating module for resource application. The time delay error (such as 10% of the configuration) is completely taken as the compensation time for the computing resource rebalancing module to reapply for the resources after the computing resources are recovered by the cloud provider in the whole computing process.

If the fixed price mode is used, when the fixed price is lower than the market price, the computing resources will be recovered by the cloud provider, and the computing resources can be applied again through the computing resource scheduling module, the computing resource rebalancing module and the automatic orchestrating module at the moment. By way of an embodiment, the fixed price may be determined by the computing resource scheduling module specifying the fixed price by obtaining some price rules of bidding (if the cloud provider provides), or by bidding, and raising the price to the final price (if the cloud provider does not provide the price rules). The whole pricing process may occupy $1/10$ of the time delay error, after pricing is finished, the computing resource scheduling module issues the resource information to the automatic orchestrating module for resource application, and the remaining $9/10$ of the time delay error is taken as the compensation time for the computing resource rebalancing module to reapply for the resources.

As an optional implementation mode of the embodiment, the proportion of the bidding instance to the on-demand instance is 1:1; 2:1; 5:1; 10:1 and/or 1:0.

In this embodiment, the TCO cost is reduced based on the bidding instance. According to the proportion of 1 (bidding instance):1 (on-demand instance), this model has about 33% cost savings over all on-demand modes; if the proportion is 2 (bidding instance):1 (on-demand instance), this model has about 47% cost savings over all on-demand modes; if the proportion is 3 (bidding instance):1 (on-demand instance), this model has about 38% cost savings over all on-demand modes; if the proportion is 10 (bidding instance):1 (on-demand instance), this model has about 64% cost savings over all on-demand modes; and if the proportion is 1

(bidding instance):0 (on-demand instance), this model has about 70% cost savings over all on-demand modes. The above proportions are only exemplary, and the proportion of the bidding instance to the on-demand instance can be set as required.

The embodiment provides a computing resource configuration method based on the bidding instance, and under a condition that the data scale is relatively stable, more computing resource TCO can be saved compared with the on-demand instance and the reserved instance; meanwhile, under a condition that the data module is rapidly increased, more computing resources TCO are still saved compared with the on-demand instance and the reserved instance; and through the rebalancing capability of the computing resources, the required computing resources can still be met under the condition that the computing resources are accidentally subjected to downtime or recovered by the cloud provider.

It needs to be explained that the steps shown in the flowchart of the accompanying drawing can be executed in a computer system such as a group of computer which can execute instructions; and although the logic sequence is shown in the flowchart, the shown or described steps can be executed in a sequence different from the sequence herein in some cases.

According to the embodiment, the present invention further provides a device for implementing above computing resource configuration method for enterprise cloudification. The device comprises a parameter configuration unit which is configured to be used for obtaining the parameters configured by the user through the configuration page, wherein the parameters include the proportion of the bidding instance to the on-demand instance; a computing resource scheduling module which is configured to be used for determining the total amount of computing resources required by the computing task after the computing task is obtained; and determining the computing resources corresponding to the bidding instance and the computing resources corresponding to the on-demand instance based on existing computing resources, the total amount of the computing resources and the proportion; an automatic orchestrating module which is configured to be used for applying for the computing resources from the cloud provider based on the computing resources corresponding to the bidding instance and the computing resources corresponding to the on-demand instance; and/or a computing resource rebalancing module which is configured to be used for computing the difference value between the current remaining computing resources and the total amount of the computing resources when the computing resource recovering event of the cloud provider or the downtime event is monitored; and enabling the automatic orchestrating module to apply for computing resources from the cloud provider based on the difference value, the configured parameters, the computing resources corresponding to the bidding instance, and the computing resources corresponding to the on-demand instance.

Referring to FIG. 2, FIG. 2 shows the schematic diagram of the computing resource configuration system for implementing enterprise cloudification, wherein a client visualization module can be implemented on a client; and the computing resource scheduling module, the computing resource rebalancing module and the automatic orchestrating module are the composition contents of the device in the embodiment. In addition, the device further comprises a parameter configuration unit, obtaining configuration parameters from the client visualization module.

Client visualization module: It is used for visualization and is mainly used for submitting information such as bidding instance types, bidding proportions and computing resource total capacity. Firstly, a computing cluster setting page is accessed by accessing corresponding link through a browser to set instance types, priorities, bidding and on-demand proportions, bidding modes, task time delay errors, maximum and minimum values of computing resources and the like. All the settings at the moment are a logical concept, and the number of required bidding instances and on-demand instances needs to be computed through the computing resource scheduling module according to the total resource quantity required by the current task and the set content; the required computing resources are created from the cloud provider by the automatic orchestrating module.

Computing resource scheduling module: It is mainly used for computing the computing resources required by the current task and existing computing resources in the current computing cluster based on the total current task amount, and computing the number of the missing bidding computing resources and the number of the on-demand computing resources according to the proportion information configured by the client visualization module; and then issuing to the automatic orchestrating module together with other configuration information. In the whole process, the module can also monitor whether existing computing resources are idle (no task runs on the computing resources), and if the idle time exceeds a certain idle time threshold value, the module can perform the recovery process of the computing resources and issue the computing resources to be recovered to the automatic orchestrating module.

Computing resource rebalancing module: It is mainly used for rebalancing the computing resources required by the task. As bidding instances are performed in the auction mode, when the price is lower than the market price, the instances can be recovered by the cloud provider, or the computing resources are insufficient due to the fact that some computing resources are subjected to downtime due to some accidental reasons. The rebalancing module can be used for starting a rebalancing mechanism of the computing resources. The rebalancing module can synchronize all applied computing resource information from the cloud provider after applying for the computing resources each time, once it is monitored that the resources are recovered by the cloud provider or the resources are accidentally subjected to downtime, the rebalancing mechanism will be started, the total number of the missing computing resources between the current remaining computing resources and the target computing resources is computed first, and then the number of the missing computing resources and related configuration information are issued to the automatic module to reapply for the computing resources.

Automatic orchestrating module: It mainly responds to resource application and recovery requests of the computing resource scheduling module and the computing resource rebalancing module, and is used for dynamically creating or releasing the computing resources from the cloud provider. This module can be used for creating and releasing the cloud resources through the declarative language by using the capability of the automatic orchestrating framework, such as a Terraform framework.

The whole computing process is described below with a real case. A batch of data needs to be computed offline, the estimated computing time is 3 hours, the allowable time delay error is 10% (serving as the time for recovering, rebalancing and bidding auction by the cloud provider), and the system estimates that 200Core resources are required according to the task load. The client visualization module is provided with two price strategy configurations, wherein the first price strategy configuration uses a mode that the bidding prices float along with the market prices, and the second price strategy configuration uses a mode of fixed bidding prices. If the first mode is used, the computing resource scheduling module will directly use information configured by the client visualization module to compute the total resource amount of the bidding and on-demand instances and issue the total resource amount to the automatic orchestrating module for resource application. 10% of the time delay error will be completely taken as the compensation time for the computing resource rebalancing module to reapply for the resources after the computing resources are recovered by the cloud provider in the whole computing process. If the fixed price mode in the second mode is selected, the computing resource scheduling module will specify the fixed price by obtaining some price rules of bidding (if the cloud provider provides), or by bidding, and raising the price to the final price (if the cloud provider does not provide the price rules). The whole pricing process may occupy $\frac{1}{10}$ of the time delay error, after pricing is finished, the computing resource scheduling module will issue resource information to the automatic orchestrating module for resource application as the first mode, and the remaining $\frac{9}{10}$ of the time delay error is taken as the compensation time for the computing resource rebalancing module to reapply for the resources.

Further, the proportion of the bidding instance to the on-demand instance in the figures is exemplary. Based on the this solution, the TCO of big data computing can be greatly reduced, the bidding instance provided by a current cloud provider has 30% to 90% TCO savings over the on-demand instances, most bidding instances have basically 70% TCO savings, and on the whole, the average saved cost of the bidding instances is about 70% of that of the on-demand instances. The reserved instances have about 30% cost savings over the on-demand instances. However, the reserved instances mean that the instances are long-time running resources, no matter for online big data computing or offline big data computing, the resources are in an idle and wasted state within a long time, and therefore the cost of the reserved instances is not really saved in the actual use scene compared with the on-demand instance.

Figure 3:
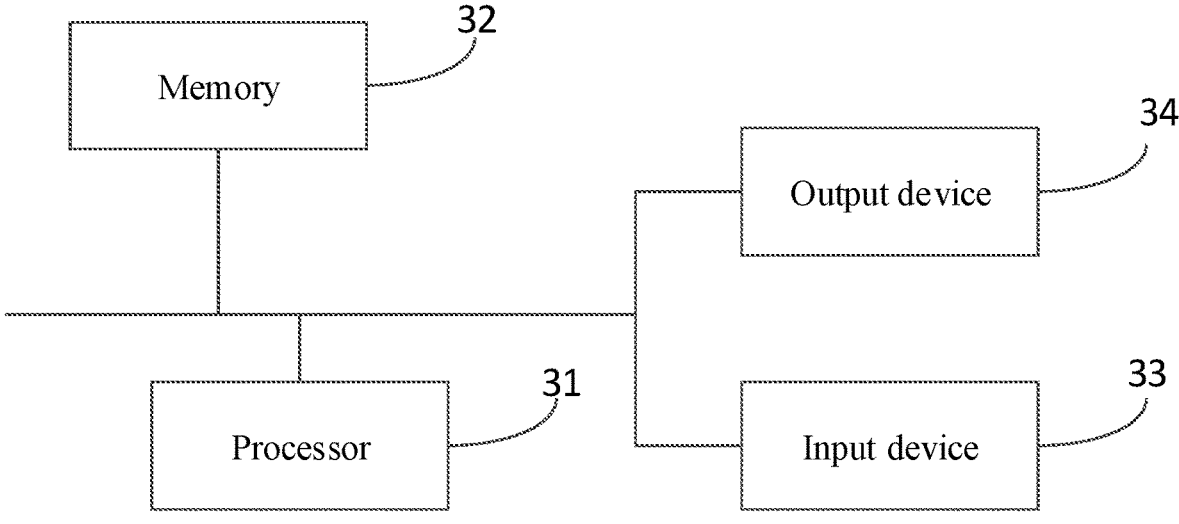
FIG. 3 is a schematic diagram of electronic equipment in an embodiment of the present invention.

The embodiment of the present invention provides a kind of electronic equipment. As shown in FIG. 3, the electronic equipment comprises one or more processors 31 and a memory 32, and one processor 31 is taken as an example in the FIG. 3.

A controller can further comprise an input device 33 and an output device 34.

The processor 31, the memory 32, the input device 33 and the output device 34 can be connected through a bus or other modes, and the connection through the bus is taken as an example in the FIG. 3.

The processor 31 can be a Central Processing Unit (CPU). The processor 31 can also be other general processors, a Digital Signal Processor (DSP), an Application Specific Integrated Circuit (ASIC), a Field-Programmable Gate Array (FPGA) or other programmable logic devices, discrete gates or transistor logic devices, discrete hardware components and other chips, or a combination of the various chips. The general processor can be a microprocessor or any conventional processor and the like.

The memory 32 is used as a non-transitory computer readable storage medium for storing non-transitory software programs, non-transitory computer executable programs and modules, such as program instructions/modules corresponding to the control method in the embodiment of the present invention. The processor 31 can be used for executing various functional applications of a server and data processing by running the non-transitory software programs, instructions and modules stored in the memory 32, thus, the method in the above method embodiment is realized.

The memory 32 may include a storage program area for storing an operating system, applications required for at least one function; and a storage data area for storing data created based on use of a processing device operated by the server. In addition, the memory 32 may include a high speed random access memory, and may also include a non-transitory memory, such as at least one disk storage device, flash memory device, or other non-transitory solid state storage device. In some embodiments, the memory 32 may optionally include memories remotely set with respect to the processor 31, the processor connecting to a network connection device via the network. Instances of such networks include, but are not limited to, the Internet, an intranet, a local area network, a mobile communication network, and a combination thereof.

The input device 33 may receive input digital or character information and generate key signal inputs related to user settings and function control of the processing device of the server. The output device 34 may include display devices such as a display screen.

One or more modules are stored in the memory 32, and when the modules are executed by the one or more processors 31, the method as shown in FIG. 1 is performed.

Those skilled in the art can understand that the realization of all or part of the processes in the methods of the above embodiments can be completed by instructing the relevant hardware through the computer program, and the program can be stored in the computer-readable storage medium. When the program is executed, it may include the process of the above-mentioned embodiments of the motor control methods The storage medium can be a disk, an optical disk, a Read-Only Memory (ROM), a Random Access Memory (RAM), a Flash Memory, a Hard Disk Drive (HDD) or a Solid-State Drive (SSD) and the like; and the storage medium can also comprise a combination of the above-mentioned memories.

Although the embodiments of the present invention have been described in conjunction with the accompanying drawings, various modifications and variations can be made by those skilled in the art without departing from the spirit and scope of the present invention, and such modifications and variations fall within the scope of the appended claims within the limited range.

The invention claimed is:

1. A computing resource configuration method for enterprise cloudification comprises the following steps:

obtaining parameters configured by a user through a configuration page, wherein the parameters include a proportion of a bidding instance to an on-demand instance;

determining a total amount of computing resources required by a computing task after the computing task is obtained; determining the computing resources corresponding to the bidding instance and the computing resources corresponding to the on-demand instance based on existing computing resources, the total amount of the computing resources and the proportion; and applying for the computing resources from a cloud provider based on the computing resources corresponding to the bidding instance and the computing resources corresponding to the on-demand instance; wherein before applying for the computing resources from the cloud provider, the method further comprises the following steps:

computing a difference value between the current remaining computing resources and the total amount of the computing resources when a computing resource recovering event of the cloud provider or a downtime event is monitored; and applying for the computing resources from the cloud provider based on the difference value, the configured parameters, the computing resources corresponding to the bidding instance and the computing resources corresponding to the on-demand instance;

wherein the method further comprises:

monitoring existing computing resources; and releasing idle computing resources if the idle computing resources exist in the existing computing resources, wherein when determining, a missing computing resource capacity, monitoring, whether computing resources in a computing cluster being idle at present or not; if an idle time exceeding a certain time threshold value, carrying out, a recovery process of the computing resources; and sending a computing resource recovery request to an automatic orchestrating module in the recovery process, and then responding, the computing resource recovery request, by the automatic orchestrating module, to release the computing resources.

2. The computing resource configuration method for enterprise cloudification according to claim 1, wherein the step of obtaining the parameters configured by the user through the configuration page further includes: obtaining a bidding mode of the bidding instance, wherein the bidding mode includes a floating bidding mode and a fixed price mode;

in the floating bidding mode, the computing resources corresponding to the bidding instance and the computing resources corresponding to the on-demand instance are directly determined based on the configured parameters; and in the fixed bidding mode, if the set bidding price is lower than the market price, the computing resources corresponding to the bidding instance and the computing resources corresponding to the on-demand instance are determined again based on the configured parameters after the cloud provider recovers the computing resources.

3. The computing resource configuration method for enterprise cloudification according to claim 1, wherein the step of obtaining the parameters configured by the user through the configuration page further includes:

obtaining types of instances configured by the user through the configuration page; and determining the number of the required different instance types based on the types of the instances and the total amount of computing resources required by the computing task in a computing resource creation process.

4. The computing resource configuration method for enterprise cloudification according to claim 1, wherein the step of obtaining the parameters configured by the user through the configuration page further includes: obtaining the percentage of time delay errors of the tasks configured by the user through the configuration page.

5. The computing resource configuration method for enterprise cloudification according to claim 1, wherein the step of obtaining the parameters configured by the user through the configuration page further includes:

obtaining the maximum value of the computing resources configured by the user through the configuration page; and obtaining the minimum value of the computing resources configured by the user through the configuration page.

6. The computing resource configuration method for enterprise cloudification according to claim 1, wherein the proportion of the bidding instance to the on-demand instance is 1:1; 2:1; 5:1; 10:1; and/or 1:0.

7. A non-transitory computer readable storage medium, being used for storing computer instructions, wherein the computer instructions are used for enabling a computer to execute the computing resource configuration method for enterprise cloudification according to claim 6.

8. A non-transitory computer readable storage medium, being used for storing computer instructions, wherein the computer instructions are used for enabling a computer to execute the computing resource configuration method for enterprise cloudification according to claim 5.

9. A non-transitory computer readable storage medium, being used for storing computer instructions, wherein the computer instructions are used for enabling a computer to execute the computing resource configuration method for enterprise cloudification according to claim 3.

10. A non-transitory computer readable storage medium, being used for storing computer instructions, wherein the computer instructions are used for enabling a computer to execute the computing resource configuration method for enterprise cloudification according to claim 2.

11. A non-transitory computer readable storage medium, being used for storing computer instructions, wherein the computer instructions are used for enabling a computer to execute the computing resource configuration method for enterprise cloudification according to claim 1.

12. A non-transitory computer readable storage medium, being used for storing computer instructions, wherein the computer instructions are used for enabling a computer to execute the computing resource configuration method for enterprise cloudification according to claim 1.

13. An electronic equipment, comprising at least one processor and a memory in communication connection with the at least one processor, wherein the memory is used for storing a computer program which can be executed by the at least one processor and the computer program is executed by the at least one processor, so that the at least one processor can be used for executing the computing resource configuration method for enterprise cloudification according to claim 6.

14. An electronic equipment, comprising at least one processor and a memory in communication connection with the at least one processor, wherein the memory is used for storing a computer program which can be executed by the at least one processor and the computer program is executed by the at least one processor, so that the at least one processor can be used for executing the computing resource configuration method for enterprise cloudification according to claim 4.

15. An electronic equipment, comprising at least one processor and a memory in communication connection with the at least one processor, wherein the memory is used for storing a computer program which can be executed by the at least one processor and the computer program is executed by the at least one processor, so that the at least one processor can be used for executing the computing resource configuration method for enterprise cloudification according to claim 2.

16. An electronic equipment, comprising at least one processor and a memory in communication connection with the at least one processor, wherein the memory is used for storing a computer program which can be executed by the at least one processor and the computer program is executed by the at least one processor, so that the at least one processor can be used for executing the computing resource configuration method for enterprise cloudification according to claim 1.

17. An electronic equipment, comprising at least one processor and a memory in communication connection with the at least one processor, wherein the memory is used for storing a computer program which can be executed by the at least one processor and the computer program is executed by the at least one processor, so that the at least one processor can be used for executing the computing resource configuration method for enterprise cloudification according to claim 1.

* * * * *